US012666201B2

(12) United States Patent
Mao et al.

(10) Patent No.: US 12,666,201 B2
(45) Date of Patent: Jun. 23, 2026

(54) VIBRATION MOTOR WITH A FRAME HAVING A CANTILEVER FOR CONNECTING A DRIVING UNIT

(71) Applicant: AAC Microtech (Changzhou) Co., Ltd., Changzhou (CN)

(72) Inventors: Lubin Mao, Changzhou (CN); Yun Tang, Changzhou (CN); Jie Ma, Changzhou (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 154 days.

(21) Appl. No.: 18/631,001

(22) Filed: Apr. 9, 2024

(65) Prior Publication Data

US 2025/0203277 A1 Jun. 19, 2025

Related U.S. Application Data

(63) Continuation of application No. PCT/CN2023/139061, filed on Dec. 15, 2023.

(51) Int. Cl.
*H04R 1/28* (2006.01)
*H04R 9/02* (2006.01)
*H04R 9/04* (2006.01)
*H04R 9/06* (2006.01)

(52) U.S. Cl.
CPC ........... *H04R 1/2896* (2013.01); *H04R 9/025* (2013.01); *H04R 9/046* (2013.01); *H04R 9/06* (2013.01); *H04R 2400/11* (2013.01)

(58) Field of Classification Search
CPC .... H04R 1/2896; H04R 1/2807; H04R 9/025; H04R 9/046; H04R 9/06; H04R 2400/11; H04R 2400/07; H02K 33/18; H02K 35/00; H02K 35/02; H02K 35/04
USPC .................................................. 381/354, 353
See application file for complete search history.

(56) References Cited

U.S. PATENT DOCUMENTS

| | | | | |
|---|---|---|---|---|
| 4,410,769 A * | 10/1983 | Tibbetts | H04R 11/00 381/176 |
| 10,009,693 B2 * | 6/2018 | van Halteren | H04R 11/04 |
| 2012/0153748 A1 * | 6/2012 | Wauke | H02K 33/16 310/25 |
| 2017/0110947 A1 * | 4/2017 | Mao | H02K 5/04 |
| 2017/0288519 A1 * | 10/2017 | Kim | H02K 33/16 |
| 2018/0342937 A1 * | 11/2018 | Mao | H02K 33/02 |
| 2020/0212778 A1 * | 7/2020 | Tao | H02K 33/18 |

* cited by examiner

*Primary Examiner* — Ahmad F. Matar
*Assistant Examiner* — Sabrina Diaz
(74) *Attorney, Agent, or Firm* — Wiersch Law Group

(57) ABSTRACT

A vibration motor is disclosed. The vibration motor includes a frame, a vibration unit, a driving unit and a suspension member for suspending the vibration unit. The driving unit is adjacent to a side wall of the frame. The side wall is provided with a cantilever corresponding to the driving unit. The driving unit is elastically connected to the frame through the cantilever. An elastic deformation direction of the cantilever is perpendicular to that of the suspension member. The vibration motor can eliminate redundant vibrations and improve the stability.

7 Claims, 4 Drawing Sheets

VIBRATION MOTOR WITH A FRAME HAVING A CANTILEVER FOR CONNECTING A DRIVING UNIT

FIELD OF THE PRESENT DISCLOSURE

The present disclosure relates to the technical field of motors, in particular to a vibration motor.

DESCRIPTION OF THE RELATED ART

With the development of science and technology as well as social progress, portable electronic products, such as mobile phones, handheld game consoles, navigation devices and handheld multimedia entertainment devices, are widely used in people's daily life. Some usage scenarios of these portable electronic products, such as phone call prompts, message prompts, navigation prompts and the vibration feedback of handheld game consoles, are generally realized by vibration motors.

A vibration motor in the related art includes a vibration unit and a driving unit, the driving unit is a stator, and the vibration unit vibrates back and forth for providing vibration sensations. Typically, the vibration unit is suspended by a suspension member, and the suspension member supports vibrations of the vibration unit and provides elastic restoring forces to the vibration unit. However, in practice, because of assembly tolerances and structural defects of the suspension member and the vibration unit, the vibration unit vibrates not linearly, but deflects in other directions. These deflections belong to redundant vibrations which cause noises and cannot match the preset vibration effects.

Thus, it is necessary to provide a novel vibration motor to solve the problems.

SUMMARY

An objective of the present disclosure is to overcome the above technical problems and provide a vibration motor which can eliminate redundant vibrations and improve the stability.

In order to achieve the objective mentioned above, the present disclosure discloses a vibration motor including a frame having a cavity, a vibration unit contained in the cavity, a driving unit contained in the cavity and configured to drive the vibration unit for vibrating, and a suspension member configured to suspend the vibration unit in the cavity. The driving unit is adjacent to a side wall of the frame. The side wall is provided with a cantilever corresponding to the driving unit. The driving unit is elastically connected to the frame through the cantilever. An elastic deformation direction of the cantilever is perpendicular to that of the suspension member.

In some embodiments, an amount of the suspension members is two. The two suspension members are disposed at two opposite sides of the vibration unit respectively. One end of each suspension member is connected to the frame, and another end of each suspension member is connected to the vibration unit.

In some embodiments, an amount of the cantilevers is two. Free ends of the two cantilevers are opposite to each other. The driving unit is connected to the two cantilevers simultaneously.

In some embodiments, the driving unit includes a magnetically conductive part and a coil wound on the magnetically conductive part.

In some embodiments, the driving unit includes a magnetically conductive part and a coil. The magnetically conductive part includes two first portions opposite to each other and a second portion connecting the two first portions. The coil is wound on the second portion. The two first portions are connected to the two cantilevers respectively.

In some embodiments, the vibration unit includes a weight, a magnet installed on the weight and a magnetically conductive plate sandwiched between the weight and the magnet. At least part of the driving unit is surrounded by the weight. A gap is formed between the part of the driving unit surrounded by the weight and the magnet.

In some embodiments, the frame is further provided with a limiting block for limiting a vibration amplitude of the vibration unit and a circuit board for feeding the driving unit.

In another aspect, the present disclosure also discloses a vibration motor including a vibration unit having a weight, a driving unit configured to drive the vibration unit for vibrating, and a frame configured to accommodate the vibration unit and the driving unit. One of the vibration unit and the driving unit includes a coil, and the other includes a magnet for electromagnetically interacting with the coil. Along a direction perpendicular to a vibration direction of the vibration unit, at least part of the driving unit locates between the vibration unit and a side wall of the frame. The side wall is provided with a cantilever corresponding to the driving unit. A part of the driving unit adjacent to the side wall is connected to a free end of the cantilever. An elastic deformation direction of the cantilever is consistent with a direction of a line connecting the vibration unit, the driving unit and the side wall.

In some embodiments, the vibration motor further includes a suspension member. The suspension member is configured to suspend the vibration unit in the frame. An elastic deformation direction of the suspension member is consistent with the vibration direction of the vibration unit.

In some embodiments, an amount of the cantilevers is two. Free ends of the two cantilevers are opposite to each other.

In some embodiments, the vibration unit includes the magnet. The magnet is installed on the weight. The driving unit includes a magnetically conductive part and the coil. The coil is wound on the magnetically conductive part. At least part of the driving unit is surrounded by the weight. A gap is formed between the part of the driving unit surrounded by the weight and the magnet.

In some embodiments, the driving unit includes a magnetically conductive part and the coil. The magnetically conductive part includes two first portions opposite to each other and a second portion connecting the two first portions. The coil is wound on the second portion. The two first portions are connected to the two cantilevers respectively.

In the vibration motor according to the present disclosure, the driving unit is elastically connected to the frame through the cantilever. When the vibration unit generates redundant vibrations in other directions, by virtue of the cantilever, the driving unit can generate the reverse vibrations with the same frequency as the redundant vibrations of the vibration unit, which can reduce the redundant vibrations of the vibration unit in other directions without affecting the linear vibrations of the vibration unit, thereby making the vibration motor can eliminate redundant vibrations and improve the stability.

BRIEF DESCRIPTION OF THE DRAWINGS

In order to more clearly illustrate the technical solutions in embodiments of the present disclosure, the accompanying drawings used in the description of the embodiments will be briefly introduced below. It is apparent that, the accompanying drawings in the following description are only some embodiments of the present disclosure, and other drawings can be obtained by those of ordinary skill in the art based on the accompanying drawings without creative efforts, wherein.

REFERENCE NUMBERS

Figure 1:
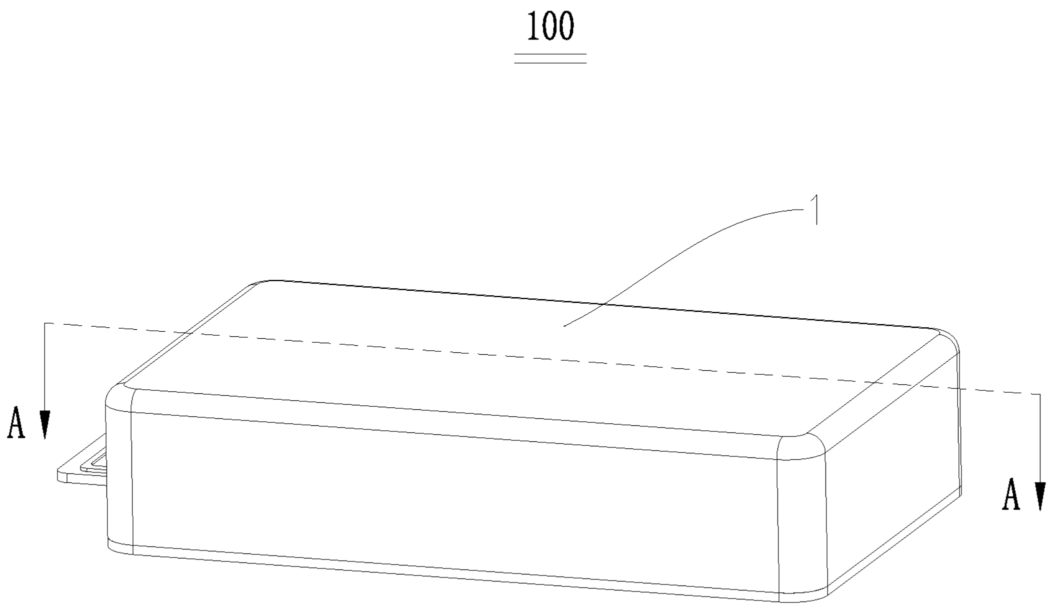
FIG. 1 is an isometric view of a vibration motor in accordance with an exemplary embodiment of the present disclosure.
Figure 2:
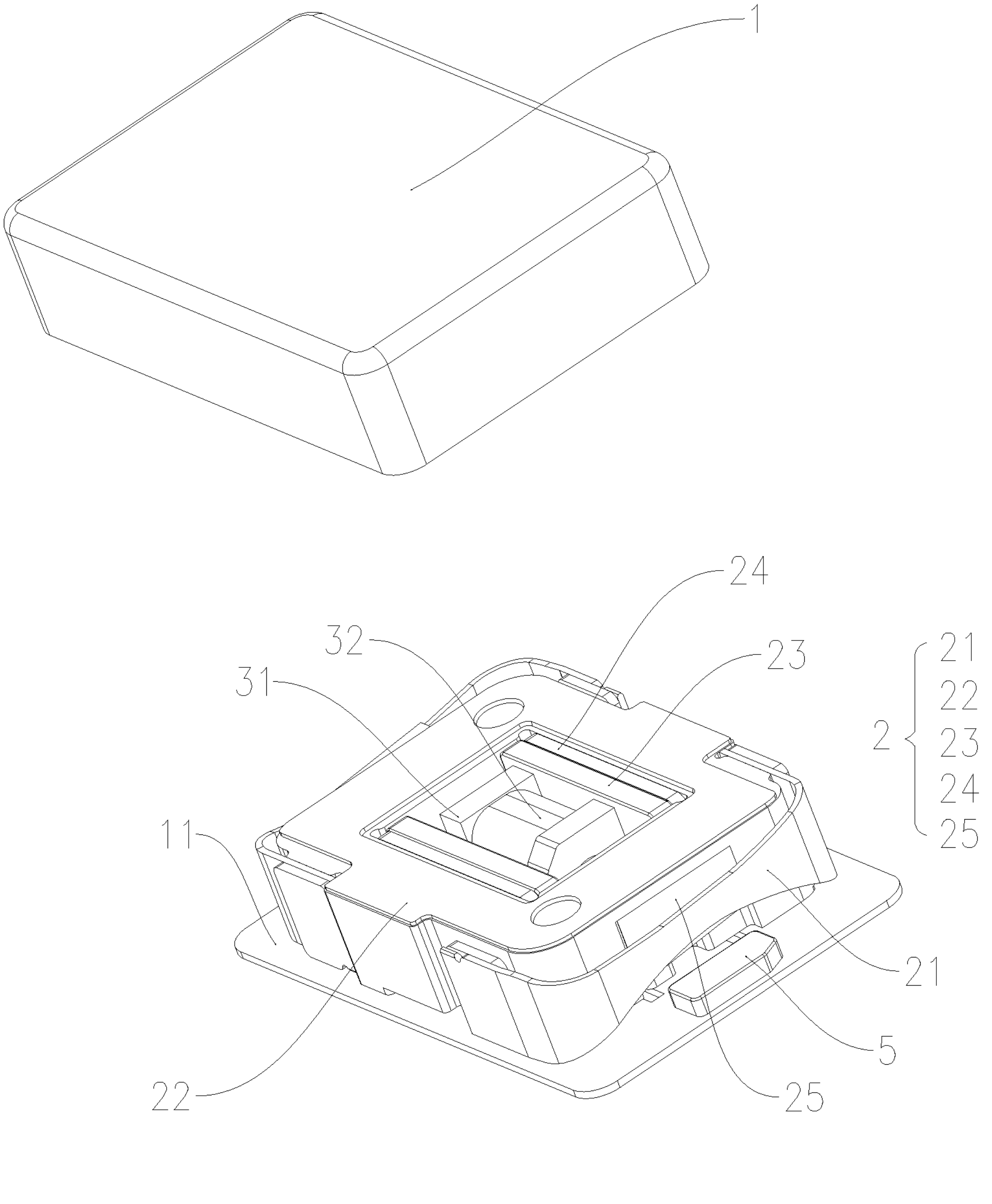
FIG. 2 is a partially exploded view of the vibration motor in FIG. 1.

100: vibration motor;
1: frame, 11: side wall, 11*a*: cantilever;
2: vibration unit, 21: suspension member, 22: weight, 23: magnet, 24: magnetically conductive plate, 25: damping element;
3: driving unit, 31: magnetically conductive part, 31*a*: first portion, 31*b*: second portion, 32: coil;
4: circuit board; and
5: limiting block.

DETAILED DESCRIPTION OF THE EMBODIMENTS

The technical solutions in embodiments of the present disclosure will be described clearly and completely below with reference to the accompanying drawings in the embodiments of the present disclosure. It is apparent that, the described embodiments are merely some of rather than all of the embodiments of the present disclosure. All other embodiments acquired by those of ordinary skill in the art without creative efforts based on the embodiments of the present disclosure shall fall within the protection scope of the present disclosure.

Referring to FIGS. 1-5, the present disclosure discloses a vibration motor 100 including a frame 1 having a cavity and a vibration unit 2 and a driving unit 3 that are contained in the cavity.

The vibration unit 2 is suspended in the cavity by a suspension member 21. The driving unit 3 is adjacent to a side wall 11 of the frame 1. The side wall 11 is provided with a cantilever 11*a* corresponding to the driving unit 3. The driving unit 3 is elastically connected to the frame 1 through the cantilever 11*a*. An elastic deformation direction of the cantilever 11*a* is perpendicular to that of the suspension member 21.

Figure 3:
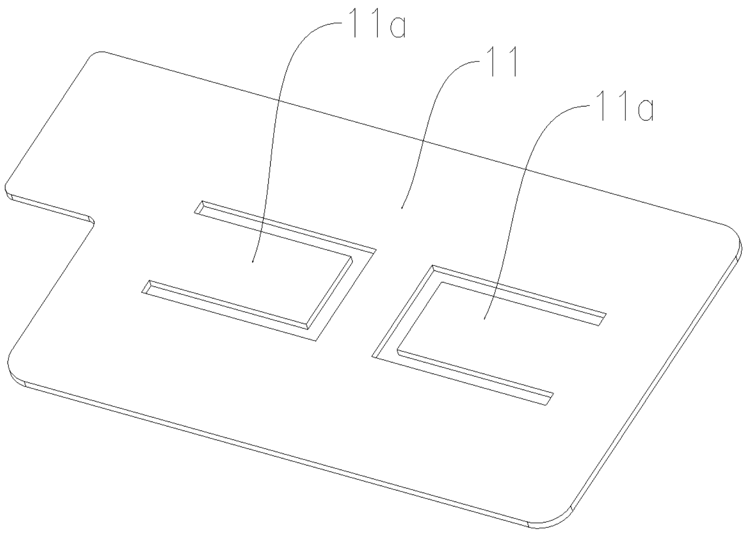
FIG. 3 is an isometric view of a side wall of the vibration motor in FIG. 1.
Figure 4:
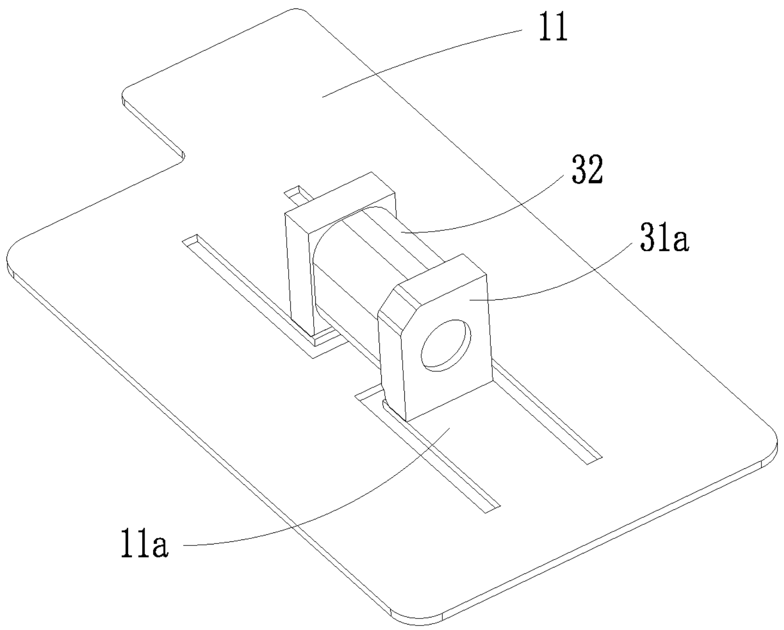
FIG. 4 is an isometric view of an assembly of a side wall and a driving unit of the vibration motor in FIG. 1.

Referring to FIGS. 3 and 4, in this embodiment, an amount of the cantilevers 11*a* is two. Free ends of the two cantilevers 11*a* are opposite to each other. The driving unit 3 is connected to the two cantilevers 11*a* simultaneously. It should be noted that, in other embodiments, the amount of the cantilevers 11*a* is not limited to two, but can also be one, three and more. Referring to FIG. 3, in this embodiment, the cantilever 11*a* is shaped as a rectangular strip and is formed by partially cutting the side wall 11, three edges of the rectangular strip is separated from the frame 1. It should be noted that, in other embodiments, the cantilever 11*a* may also be of other shapes, and the formation way of the cantilever 11*a* is not limited to this, but can also be formed in other ways.

The vibration unit 2 includes a weight 22 having a hollow center, a magnet 23 installed on the weight 22 and a magnetically conductive plate 24 sandwiched between the weight 22 and the magnet 23 for converging magnetic fields. Optionally, an amount of the suspension members 21 is two. The two suspension members 21 are disposed at two opposite sides of the vibration unit 2 respectively. One end of each suspension member 21 is connected to the frame 1, and another end of each suspension member 21 is connected to the weight 22. A damping element 25 may also be sandwiched between the suspension member 21 and the weight 22, which can make vibrations of the vibration unit 2 softer and more stable during the vibration unit 2 vibrates.

Figure 5:
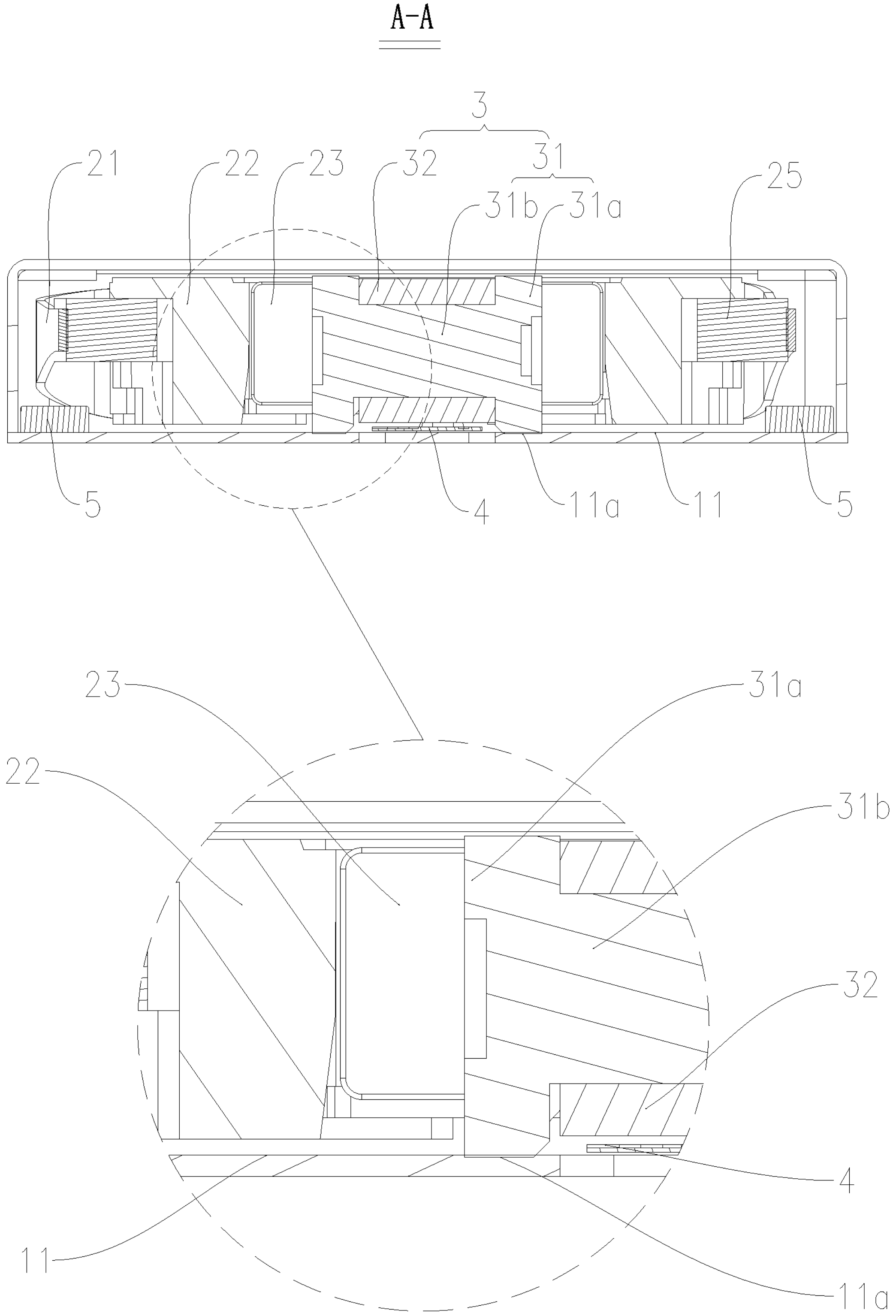
FIG. 5 is a cross-sectional view of the vibration motor, taken along line A-A in FIG. 1.

The driving unit 3 drives the vibration unit 2 for vibrating. At least part of the driving unit 3 is surrounded by the weight 22. A gap is formed between the part of the driving unit 3 surrounded by the weight 22 and the magnet 23. The driving unit 3 includes a magnetically conductive part 31 and a coil 32 wound on the magnetically conductive part 31. Referring to FIG. 5, in this embodiment, the cross-sectional view of the magnetically conductive part 31 is of an "H" shape, and includes two first portions 31*a* opposite to each other and a second portion 31*b* connecting the two first portions 31*a*. The coil 32 is wound on the second portion 31*b*. Referring to FIG. 4, in this embodiment, the two first portions 31*a* of the magnetically conductive part 31 are connected to the free ends of the two cantilevers 11*a* respectively.

The frame 1 is further provided with a circuit board 4 for feeding the driving unit 3 and a limiting block 5 for limiting a vibration amplitude of the vibration unit 2.

In another aspect, referring to FIGS. 1-5 again, the present disclosure also discloses another vibration motor including a frame 1 and a vibration unit 2 and a driving unit 3 that are accommodated in the frame 1. Along a direction perpendicular to a vibration direction of the vibration unit 2, at least part of the driving unit 3 locates between the vibration unit 2 and a side wall 11 of the frame 1. The side wall 11 is provided with a cantilever 11*a* corresponding to the driving unit 3. A part of the driving unit 3 adjacent to the side wall 11 is connected to a free end of the cantilever 11*a*. An elastic deformation direction of the cantilever 11*a* is consistent with a direction of a line connecting the vibration unit 2, the driving unit 3 and the side wall 11.

In this embodiment, the cantilever 11*a* is formed by partially cutting the side wall 11. It should be noted that, in other embodiments, the formation way of the cantilever 11*a* is not limited to this, but can also be formed in other ways.

The vibration unit 2 has a weight 22. The driving unit 3 drives the vibration unit 2 for vibrating. One of the vibration unit 2 and the driving unit 3 includes a coil 32, and the other includes a magnet 23 for electromagnetically interacting with the coil 32.

In this embodiment, the vibration unit 2 includes the magnet 23, and the driving unit 3 includes the coil 32. The magnet 23 is installed on the weight 22. But, as a choice, the magnet 23 and the coil 32 can act reversely, that is, the vibration unit 2 includes the coil 32, and the driving unit 3 includes the magnet 23.

The vibration unit 2 is elastically suspended in the frame 1 by a suspension member 21. An elastic deformation direction of the suspension member 21 is consistent with the vibration direction of the vibration unit 2.

At least part of the driving unit 3 is surrounded by the weight 22. A gap is formed between the part of the driving unit 3 surrounded by the weight 22 and the magnet 23. In other embodiments, the driving unit 3 and the weight 22 may also be in other positional relationships.

Optionally, an amount of the cantilevers 11$a$ is two. Free ends of the two cantilevers 11$a$ are opposite to each other. The driving unit 3 further includes a magnetically conductive part 31. The coil 32 is wound on the magnetically conductive part 31. The magnetically conductive part 31 includes two first portions 31$a$ opposite to each other and a second portion 31$b$ connecting the two first portions 31$a$. The coil 32 is wound on the second portion 31$b$. The two first portions 31$a$ are connected to the two cantilevers 11$a$ respectively.

The frame 1 is further provided with a circuit board 4 for feeding the driving unit 3 and a limiting block 5 for limiting a vibration amplitude of the vibration unit 2. A damping element 25 may also be sandwiched between the suspension member 21 and the weight 22, which can make vibrations of the vibration unit 2 softer and more stable during the vibration unit 2 vibrates.

In the vibration motor according to the present disclosure, the driving unit 3 is elastically connected to the frame 1 through the cantilever 11$a$. When the vibration unit 2 generates redundant vibrations in other directions, by virtue of the cantilever 11$a$, the driving unit 3 can generate the reverse vibrations with the same frequency as the redundant vibrations of the vibration unit 2, which can reduce the redundant vibrations of the vibration unit 2 in other directions without affecting the linear vibrations of the vibration unit 2, thereby making the vibration motor can eliminate redundant vibrations and improve the stability.

The above are only embodiments of the present disclosure. It should be pointed out that those of ordinary skill in the art may also make improvements without departing from the ideas of the present disclosure, all of which fall within the protection scope of the present disclosure.

What is claimed is:

1. A vibration motor, comprising:

a frame having a cavity;

a vibration unit contained in the cavity;

a driving unit contained in the cavity and configured to drive the vibration unit for vibrating; and a suspension member configured to suspend the vibration unit in the cavity;

wherein the driving unit is adjacent to a side wall of the frame, the side wall is provided with a cantilever corresponding to the driving unit, the driving unit is elastically connected to the frame through the cantilever, an elastic deformation direction of the cantilever is perpendicular to that of the suspension member, and wherein an amount of the cantilevers is two, free ends of the two cantilevers are opposite to each other, the driving unit is connected to the two cantilevers simultaneously, the driving unit comprises a magnetically conductive part and a coil, the magnetically conductive part comprises two first portions opposite to each other and a second portion connecting the two first portions, the coil is wound on the second portion, the two first portions are connected to the two cantilevers respectively.

2. The vibration motor as described in claim 1, wherein an amount of the suspension members is two, the two suspension members are disposed at two opposite sides of the vibration unit respectively, one end of each suspension member is connected to the frame, and another end of each suspension member is connected to the vibration unit.

3. The vibration motor as described in claim 1, wherein the vibration unit comprises a weight, a magnet installed on the weight and a magnetically conductive plate sandwiched between the weight and the magnet, at least part of the driving unit is surrounded by the weight, a gap is formed between the part of the driving unit surrounded by the weight and the magnet.

4. The vibration motor as described in claim 3, wherein the frame is further provided with a limiting block for limiting a vibration amplitude of the vibration unit and a circuit board for feeding the driving unit.

5. A vibration motor, comprising:

a frame having a cavity;

a vibration unit contained in the cavity;

a driving unit contained in the cavity and configured to drive the vibration unit for vibrating; and a suspension member configured to suspend the vibration unit in the cavity;

wherein the driving unit is adjacent to a side wall of the frame, the side wall is provided with a cantilever corresponding to the driving unit, the driving unit is elastically connected to the frame through the cantilever, an elastic deformation direction of the cantilever is perpendicular to that of the suspension member, and wherein the driving unit comprises a magnetically conductive part and a coil wound on the magnetically conductive part, the vibration unit comprises a weight, a magnet installed on the weight and a magnetically conductive plate sandwiched between the weight and the magnet, at least part of the driving unit is surrounded by the weight, a gap is formed between the part of the driving unit surrounded by the weight and the magnet.

6. The vibration motor as described in claim 5, wherein an amount of the suspension members is two, the two suspension members are disposed at two opposite sides of the vibration unit respectively, one end of each suspension member is connected to the frame, and another end of each suspension member is connected to the vibration unit.

7. The vibration motor as described in claim 5, wherein the frame is further provided with a limiting block for limiting a vibration amplitude of the vibration unit and a circuit board for feeding the driving unit.

* * * * *